Oct. 11, 1966   H. SEIDEL   3,278,749
OPTICAL WAVE MODULATOR
Filed March 20, 1963   2 Sheets-Sheet 1

INVENTOR
H. SEIDEL
BY
Sylvan Sherman
ATTORNEY

United States Patent Office 3,278,749
Patented Oct. 11, 1966

3,278,749
OPTICAL WAVE MODULATOR
Harold Seidel, Fanwood, N.J., assignor to Bell Telephone Laboratories, Incorporated, New York, N.Y., a corporation of New York
Filed Mar. 20, 1963, Ser. No. 266,608
9 Claims. (Cl. 250—199)

This invention relates to signal modulators and, in particular, to means for amplitude modulating electromagnetic wave energy in the infrared, visible and ultraviolet portion of the frequency spectrum.

Means for generating electromagnetic waves in the infrared, visible and ultraviolet frequency ranges, hereinafter to be referred to collectively as the light range or the optical range, have been disclosed in United States Patent 2,929,922, issued to A. L. Schawlow et al. and in the copending United States application of A. Javan, Serial No. 816,276, filed May 26, 1959, now abandoned in favor of the continuation-in-part application Serial No. 277,651, filed May 2, 1963. Wave energy generated in the manner explained by Schawlow et al. and by Javan is characterized by a high degree of monochromaticity and coherency. In addition, because of the very high frequency of the wave energy in the optical portion of the frequency spectrum, such wave energy is capable of carrying enormous amounts of information and is, therefore, particularly useful as a transmission medium in a communication system. However, efficient utilization of this great potential is dependent upon the availability of means for modulating wave energy at these very high frequencies.

It is, accordingly, the broad object of this invention to amplitude modulate electromagnetic waves in the optical portion of the frequency spectrum.

In United States Patents 2,565,514 and 2,997,922 the technique of frustrated total internal reflections is used to effect the amplitude modulation of light waves. Such devices typicaly comprise two transparent media separated by a third, less dense optical medium. The incident light is caused to impinge upon a surface of the less dense optical material at an angle greater than the critical angle. Normally, under such conditions, total internal reflection occurs. However, if the thickness of the less dense medium is small compared to a wavelength of the incident light, the total internal reflection is frustrated and some of the incident light propagates on through the less dense medium. Accordingly, in this class of prior art devices, modulation is produced by mechanically varying the thickness of the intermediate medium in accordance with the modulating frequency.

It is apparent, however, that this type of arrangement limits the choice of materials that can be used to gases since the intermediate material must be compressible. Furthermore, to vary the thickness of this material requires mechanical motion, which inherently limits the frequencies that can be used to modulate the light to a relatively low range.

It is, accordingly, an object of this invention to modulate optical waves at microwave frequencies.

In accordance with the invention, modulation of an optical wave is achieved by electrically varying the dielectric properties of an electro-optical material. In particular, an optical cavity is provided whose effective electrical length (or thickness) is a function of the refractive index of the materials. Energy is introduced into the cavity by impinging the incident light wave upon a surface of the material at an angle of incidence slightly less than the critical angle. The thickness of the material is made a multiple of half a guided wavelength of the refracted wave to produce a resonance condition which is sensitive to changes in the refractive index of the material. (The term "guided wavelength" is defined as equal to the product of the wavelength of the light wave in the material and the secant of the angle of refraction.)

At resonance substantially all of the incident light wave is propagated through the cavity. Modulation is produced by varying the refractive index by changing the intensity of the electric field across the material. These changes detune the cavity thereby decreasing the transmissivity in accordance with variations of the modulating signal.

In the illustrative embodiments to be described in greater detail hereinbelow, a disk of electro-optical material is bounded on both sides by a transparent medium of greater optical density. In one of the illustrative embodiments discussed, electrodes, connected to a modulating signal source, are placed at the surfaces of a disk to produce a varying electric field through the disk. In a second embodiment the modulator is placed in a waveguide supportive of the modulating signal.

These and other objects and advantages, the nature of the present invention, and its various features, will appear more fully upon consideration of the various illustrative embodiments now to be described in detail in connection with the accompanying drawings, in which:

FIG. 1 given for purposes of explanation, shows the effect upon a light ray of materials of different optical density;

Figure 1:
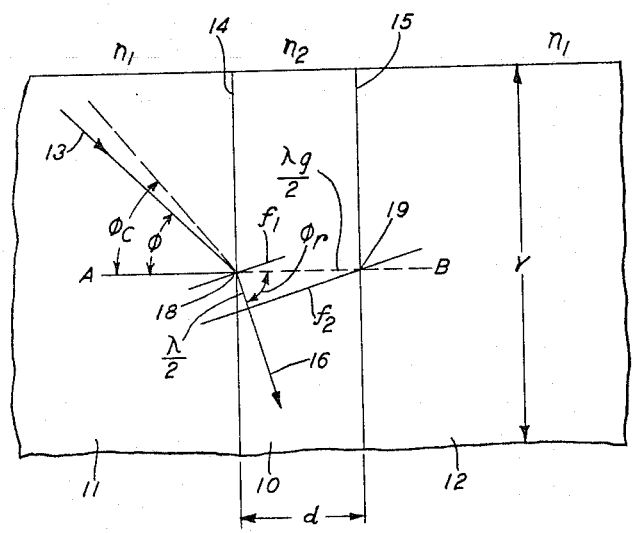

FIG. 1, given for purposes of explanation, shows a layer of electro-optical material 10, designated by its index of refraction $n_2$, bounded on both sides by a medium of greater optical density, $n_1$. The material 10 has a pair of planar, parallel surfaces 14 and 15 spaced apart a distance $d$. For purposes of explanation, material 10 is assumed to be a disk. In addition, and for purposes of identification, the portion, or window, to the left of the disk 10 is designated 11 and the portion, or window, to the right is designated 12.

The critical angle condition for a ray of light incident upon surface 14 from window 11 is given by $$\sin \varphi_c = \frac{n_2}{n_1} \quad (1)$$

In FIG. 1 a ray of coherent light 13 is directed upon surface 14 at an angle $\varphi$, slightly less than the critical angle $\varphi_c$, to produce a close-to-grazing ray 16 in medium 10 having an angle of refraction $\varphi_r$.

In accordance with the invention, all of the incident light is caused to pass on through medium 10 and into medium 12 by choosing the thickness $d$ of disk 10 so as to minimize the insertion loss, $L$, which is defined as the ratio of the incident power $P_i$, to the output power $P_o$. In terms of the system parameters, $L$ is given by $$L = 1 + \frac{1}{4}\left(\frac{\alpha_1}{\alpha_2} - \frac{\alpha_2}{\alpha_1}\right)^2 \sin^2 \theta \quad (2)$$

where $$\alpha_1 = \left(\frac{2\pi}{\lambda}\right) n_1 \cos \varphi \quad (3)$$

is the propagation constant in medium $n_1$, $$\alpha_2 = \left(\frac{2\pi}{\lambda}\right)[n_2^2 - n_1^2 \sin^2 \phi]^{1/2} \quad (4)$$

is the propagation constant in medium $n_2$, and $$\theta = \alpha_2 d \quad (5)$$

is the electrical length (or thickness) of disk 10.

From Equation 2, it is seen that L is a minimum, equal to unity, for $\theta$ equal to 180 degrees. More generally, the preferred condition is given as $$\theta = m\pi \quad (5a)$$

where $m$ is an integer greater than zero.

When the length $d$ of disk 10 is selected so as to satisfy Equation 5a, corresponding points 18 and 19 on interfaces 14 and 15, respectively, along the normal to the interfaces, A–B, are multiples of 180 degrees out of phase with one another. This condition obtains when the two wavefronts $f_1$ and $f_2$ are multiples of half a wavelength apart or the two interfaces 14 and 15 are multiples of half a guided wavelength apart, where a guided wavelength $\lambda_g$ is defined as $$\lambda_g = \lambda \sec \varphi_r \quad (6)$$

where $\lambda$ is the wavelength of the light in disk 10. This is similar to the familiar resonant condition utilized in microwave band-pass filters.

To ascertain the 3 db bandwidth of an optical cavity formed by the appropriate selection of $d$, the insertion loss given by Equation 2 is set equal to 2. Substituting $\alpha_2 d$ for $\theta$, we get $$\left| \left( \frac{\alpha_1}{\alpha_2} - \frac{\alpha_2}{\alpha_1} \right) \sin \alpha_2 d \right| = 2 \quad (7)$$

at the 3 db points.

Since the angle of incidence chosen is close to the critical angle, we have, from Equation 4, that $\alpha_2 \approx 0$. Also noting that at mid-band $\sin \alpha_2 d = 0$, the following approximation of Equation 7 is obtained for the 3 db condition:

$$\left| \frac{\alpha_1}{\alpha_2} \delta(\alpha_2 d) \right| = 2 \quad (8)$$

where $\delta(\alpha_2 d)$ is the variation of the product $\alpha_2 d$ from the value $m\pi$.

In the discussion that follows, Equation 8 is used to ascertain two important physical characteristics of the modulator. The first characteristic of importance is the modulation sensitivity which determines the voltage required to produce significant modulation. The second is the minimum diameter of the disk 10 as determined by the diffraction limit. Insofar as this cross-sectional dimension defines the capacitance of the modulator as viewed by the modulation source, it is an important practical consideration since the source impedance, taken in conjunction with this capacitance, defines the modulation bandwidth.

*Modulation sensitivity*

The modulation sensitivity is defined as that voltage required to create a 3 db change in transmission. Since $d$ is a constant, we have from Equation 8, $$\delta(\alpha_2 d) = d \frac{\partial \alpha_2}{\partial n_2} \delta n_2 = \left( \frac{2\pi}{\lambda} \right)^2 \frac{d}{\alpha_2} n_2 \delta n_2 \quad (9)$$

From the definition of the electro-optical coefficient (see American Institute of Physic Handbook, Second Edition, 1957, pages 6–96 and 6–97) we may write $$\delta \left( \frac{1}{n_2^2} \right) = r_{pq} E \quad (10)$$

for the electric field along the C axis. Defining $r = n_2^4 r_{pq}$ we then obtain $$\delta(\alpha_2 d) = \left( \frac{2\pi}{\lambda} \right)^2 \frac{r}{2\alpha_2} (Ed) = \left( \frac{2\pi}{\lambda} \right)^2 \frac{r}{2\alpha_2} V \quad (11)$$

where

V is the voltage applied across disk 10.

Substituting Equation 11 in 8 gives $$\alpha_2^2 = \left( \frac{2\pi}{\lambda} \right)^3 n_1 \left( \frac{rV}{4} \right) \cos \varphi \quad (12)$$

which relates the parameters of the modulator to the voltage V required to produce a 3 db change in transmission.

*Angular sensitivity and aperture size*

In the discussion above, it was assumed that the angle of incidence was the same for all light rays. In this section the effects of diverging light rays and finite disk size are considered.

As indicated above, the diameter of disk 10 determines the capacitance of the modulator which, in turn, determines the modulation bandwidth. Since it is an object of the invention to modulate the light wave at high frequencies (i.e., microwave frequencies and higher), the modulator capacitance is preferably made as small as possible. Accordingly, we next determine the cone angle $\Delta \varphi / 2$ about the angle of incidence which causes a 3 db change in transmission and the corresponding disk diameter Y. This calculation is obtained through the use of the Heisenberg uncertainty relationship and results in the following two equations:

$$\alpha \varphi = \frac{1}{\alpha_1 Y} \quad (13)$$

$$Y = \left[ \frac{m\lambda}{8} \right] \left[ \frac{n_1^2 \sin \varphi \cos \varphi}{(n_2^2 - n_1^2 \sin^2 \varphi)^{3/2}} \right] \quad (14)$$

Having ascertained the relations among the physical and optical parameters of the system, it is now possible to relate these to the electrical properties of the modulator.

Let us assume the modulator to be driven by a generator of impedance level R. If the electro-optical medium 10 has a dielectric constant $\epsilon$ at microwaves, then a disk of diameter Y and thickness $d$ has a capacitance given by $$C = \frac{\epsilon Y^2}{14.4 d} 10^{-12} \text{ farads} \quad (15)$$

The resulting cut-off frequency $\Omega$ in gc. per second of the RC combination formed by the generator and modulator is then $$\Omega = \frac{7200 d}{\pi R \epsilon Y^2} \quad (16)$$

Taken in conjunction with Equation 1, Equations 12, 14 and 16 can be combined to yield the following:

$$V = \frac{(mR_\epsilon \Omega)^{0.4} (n_2)^{0.8} (\lambda)^{1.4}}{138 r (n_1^2 - n_2^2)^{0.1}} \quad (17)$$

$$d = \frac{(4.69)(m)^{1.8} (\lambda)^{0.8}}{(n)^{0.4} (n_1^2 - n_2^2)^{0.2} (R_\epsilon \Omega)^{0.2}} \quad (18)$$

and $$Y = \frac{(103.5)(m)^{0.9} (\lambda)^{0.4}}{(n_2)^{0.2} (n_1^2 - n_2^2)^{0.1} (R_\epsilon \Omega)^{0.6}} \quad (19)$$

Let us now calculate the size and power requirements of a modulator constructed of $KH_2PO_4$ (potassium dihydrogen phosphate). The use of $KH_2PO_4$ is merely intended to be illustrative. Other electro-optical materials, such as those listed in the American Institute of Physics Handbook referred to above, can also be used.

I. P. Kaminow and G. O. Harding, in an unpublished paper, reported the following for the dielectric constant, $\epsilon$, and the loss tangent, $\tan \delta$, for $KH_2PO_4$, measured at 9.2 gc. per second along the C axis:

$$\epsilon = \frac{A + BT}{T - T_C} \quad (20)$$

$$\tan \delta = \frac{\alpha + \beta T + \gamma T^2}{T - T_C} \quad (21)$$

where $A = 2.27 \times 10^3 \,°\text{K}.$
$B = 4.7$
$T_C = 119° \text{K.}$, the Curie temperature
$\alpha = 8.42 \times 10^{-1} \,°\text{K}.$
$\beta = 9.49 \times 10^{-4}$
$\gamma = 8.49 \times 10^{-6}/°\text{K}.$ Since the loss tangent is proportional to frequency, we get at the average modulating frequency $\Omega/2$ that $$\tan \delta = \epsilon \rho(T) \frac{\Omega}{(9.2)(2)} \qquad (22)$$

where, from Equations 20 and 21, $$\rho(T) = \frac{\alpha + \beta T + \gamma T^2}{A + BT} \qquad (23)$$

Since the electro-optical coefficient $r$ varies directly as $\epsilon$, we may rewrite $r$ used in Equation 11 as $$r = r_0 \frac{\epsilon}{\epsilon_0} \qquad (24)$$

where $r_0$ and $\epsilon_0$ are the respective known values at some particular temperature and $r$ and $\epsilon$ are the respective values at any other temperature.

In particular for $KH_2PO_4$ at $300°$ K.

$\epsilon_0 = 20.3$
$r_{pq} = r_{63} = 1.067 \times 10^{-9} (\text{v./cm.})^{-1}$ and $n_2 = 1.506$ Using these values, Equation 17 can be rewritten as $$V = 3.72 \times 10^7 \frac{(mR\Omega)^{0.4} \lambda^{1.4}}{\epsilon^{0.6}(n_1^2 - 2.26)^{0.1}} \qquad (25)$$

The peak power stored in a capacitor is given as $\frac{1}{2}CV^2$ and the corresponding power dissipated is $\frac{1}{2}CV^2 \tan \delta$ Thus, from Equation 21 the power dissipated in the modulator at the average modulation frequency is $$P_d = \frac{1}{2} C V^2 \epsilon \rho(T) \frac{\Omega}{18.4} \qquad (26)$$

Since $\Omega C = 1/2\pi R$ we get, substituting V from Equation 25, $$P_d = 5.98 \times 10^{12} \frac{(m\Omega)^{0.8} \lambda^{2.8} \rho(T)}{(\epsilon R)^{0.2}(n_1^2 - 2.26)^{0.2}} \qquad (27)$$

The power dissipation per unit volume is then $$p = \frac{P_d}{\frac{\pi}{4} Y^2 d} \qquad (28)$$

From Equations 18, 19 and 28 we may express the dielectric constant $\epsilon$ as $$\epsilon = \frac{1.53 \times 10^{-7} p^{0.833} m^{2.333}}{R\lambda\rho(T)^{0.838} n_2^{0.667}(n_1^2 - n_2^2)^{0.167} \Omega^{1.833}} \qquad (29)$$

and the modulation voltage V as $$V = \frac{4.57 \times 10^{11} \lambda^2 R \rho(T)^{0.5} n_2^{0.4} \Omega^{1.5}}{m p^{0.5}} \qquad (30)$$

If $P_g$ is defined as the power available from the modulation generator (i.e., $P_g = \frac{1}{4} V^2/R$) we get, from Equation 30 that $$Pg = \frac{5.23 \times 10^{22} \lambda^4 \rho(T) n_2^{0.8} \Omega^3 R}{p m^2} \qquad (31)$$

Equation 31 was derived on the assumption that the modulation generator substantially works into an open circuit. This requires that $P_g \gg P_d$. It will be noted that $P_g$, as given by Equation 31, decreases with decrease of R, the generator impedance, and with increase of $m$, the number of guided half wavelengths. These same parameters, however, tend to increase $\epsilon$, as given in Equation 29. This suggests a high dielectric constant or operation near the Curie temperature as indicated by Equation 20.

Let us assume, as a typical example, that we will operate the modulator five degrees above the Curie temperature, that is, $T - T_C = 5$. From Equation 20, we get that $\epsilon = 570$. Let us also select $m = 5$, a specific dissipation rate, $p$, of 10 watts/cm.$^3$, and let us operate at the ruby line of $6.93 \times 10^{-5}$ cm.

At the operating temperature of $124°$ K., $\rho(T) = 3.0 \times 10^{-4}$

The index of refraction $KH_2PO_4$ is $n_2 = 1.5$ and we arbitrarily choose $n_1 = 1.8$.

From Equation 29 we get $R = 14.4$ ohms

From Equation 31 we get $P_g = 0.236$ watts and from Equations 18 and 19

$d = 7.75 \times 10^{-3}$ cm.

and $Y = 0.105$ cm.

The total dissipation $P_d$, from Equation 27 is 0.687 mw., which meets the requirements that the power dissipated be much less than the available generator power.

In the foregoing analysis it was indicated that the incident light is directed upon the electro-optical material at slightly less than the critical angle. Preferably, this angle, $\varphi$, is made as close to the critical angle as possible. The practical range of operation anticipated by the invention, however, lies within the range $0.9\varphi_c < \varphi < \varphi_c$ In FIG. 2 there is shown a first illustrative embodiment of the invention including means for establishing the modulating electric field within the disk of electro-optical material. Specifically, in FIG. 2, a pair of transparent, conductive electrodes 20 and 21 are inserted between the electro-optical material 22 and the surrounding layers of transparent material, or windows, 23 and 24. If the indices of refraction for the windows, the electro-optical material and the electrodes are $n_1$, $n_2$ and $n_3$, respectively, their relative magnitudes are given by $n_1 > n_2$ and $n_3 \geq n_2$ As an example, disk 22 can be made of potassium dihydrogen phosphate ($KH_2PO_4$), electrodes 20 and 21 of tin oxide ($SnO_2$) and the windows 23 and 24 of aluminum oxide ($Al_2O_3$).

In accordance with the invention, the thickness of disk 22 is made equal to an integral multiple, $m$, of guided half wavelengths. In a similar fashion the thickness of each of the electrodes 20 and 21 is also made equal to an integral multiple of guided half wavelengths so that no optical reflections are produced by their addition. In all respects the embodiment of FIG. 2 operates as explained hereinabove when a modulating signal source 25 is connected between electrodes 20 and 21 and a beam of coherent, monochromatic light is directed upon the modulator.

Figure 4:
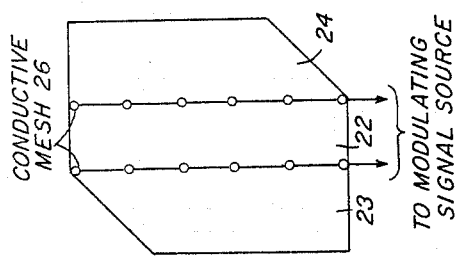
FIG. 4 is modification of the embodiment of FIG. 2 in which the electrodes are fine wire mesh.

Alternate means of modulating the electro-optical material (in place of electrodes 20 and 21) can be employed such as a fine wire mesh 26 embedded at the interfaces of disk 22 and the surrounding media 23 and 24, as illustrated in FIG. 4, or the windows themselves can consist of a transparent, conductive material and the modulating signal applied directly thereto.

Where the modulating frequency is sufficiently high so as to be more efficiently handled in waveguides, separate electrodes are omitted and the modulator placed directly in the waveguide oriented so that the modulating microwave electric field is directed in the preferred direction perpendicular to the interfaces 14 and 15.

Figure 3:
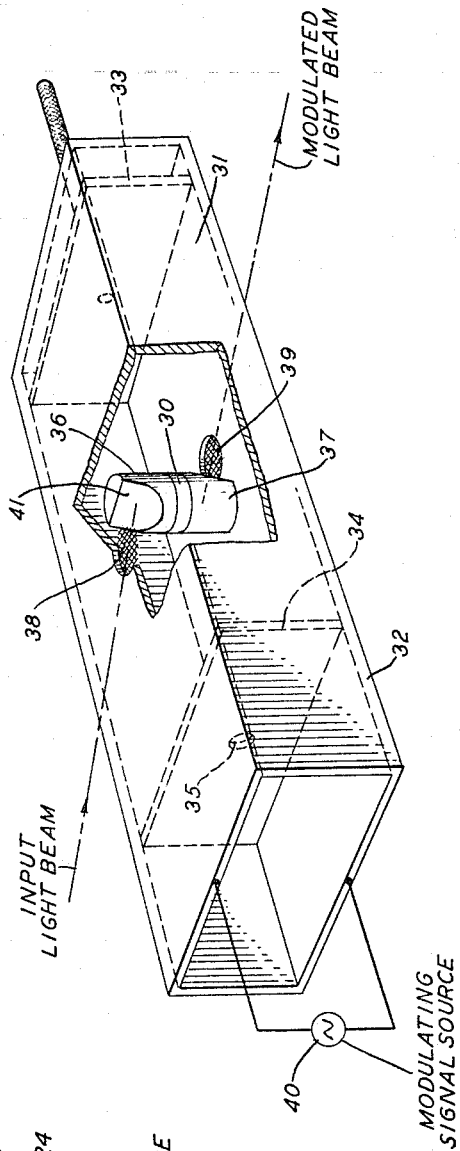
FIG. 3 is a second illustrative embodiment of the invention in which the modulating signal is supported in a waveguide.

Such an arrangement is shown in FIG. 3. As illustrated therein, the electro-optical material 30 is located within a waveguide cavity 31 formed by terminating a section of rectangular waveguide 32 at one end by means of a shorting piston 33 and at the other end by means of a second shorting member 34. Means, such as an aperture 35, are included for coupling wave energy through member 34 into cavity 31.

Cavity 31 is energized by means of a modulating signal source connected to waveguide 32.

The electro-optical material 30 is bounded on its upper and lower surfaces by two transparent, post-like members 36 and 37 of greater optical density. Preferably, members 36 and 37 are also conductive. The posts, in addition, physically support the electro-optical material within cavity 31.

The input light beam is directed upon a surface 41 of the upper post 36 through a hole 38 in the upper wide wall of cavity 31. The plane of surface 41 is preferably perpendicular to the direction of propagation of the incident light beam. After traversing the electro-optical material, the modulated light beam leaves the lower post 37 through a surface parallel to surface 41, and leaves the cavity through a hole 39 in the lower wide wall. Screening can be used to cover holes 38 and 39 to contain the modulating wave energy within the cavity if required.

The electro-optical material is located within cavity 31 in a region of substantial electric field intensity and is oriented with respect to the direction of the electric field to produce the desired electro-optical effect.

Figure 2:
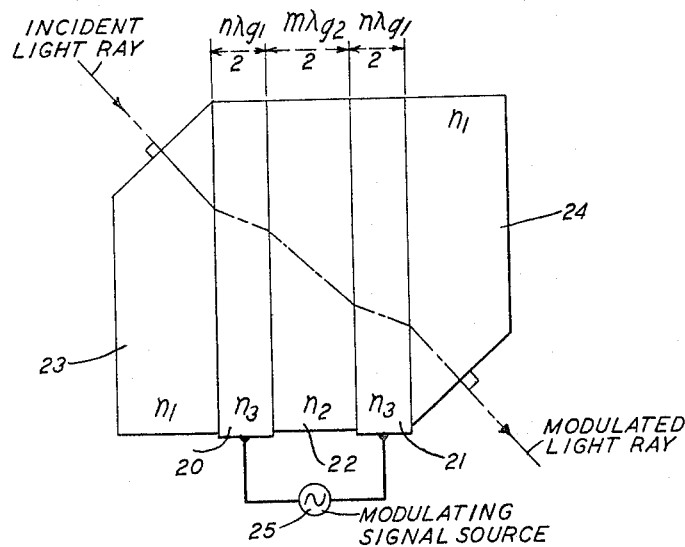
FIG. 2 shows a first illustrative embodiment of the invention in which the modulating signal is applied to a pair of electrodes.

In the illustrative embodiments of FIGS. 2 and 3, the modulating electric field is directed perpendicular to the broad dimension of the electro-optical material and parallel to its C axis. It is recognized that the preferred direction of the modulating electric field with respect to the crystalline axis depends upon the nature of the electro-optical material. Accordingly, when materials other than potassium dihydrogen phosphate are used, field directions other than the one shown may be preferred.

Thus, in all cases it is understood that the above-described arrangements are illustrative of a small number of the many possible specific embodiments which can represent applications of the principles of the invention. Numerous and varied other arrangements can readily be devised in accordance with these principles by those skilled in the art without departing from the spirit and scope of the invention.

What is claimed is:

1. An optical wave modulator comprising:
a layer of electro-optical material surrounded by a second transparent material of greater optical density;
said layer having a pair of planar, parallel surfaces spaced apart a distance equal to an integral multiple of half a guided wavelength for said optical wave;
means for directing an optical wave upon one of said surfaces at an angle of incidence less than the critical angle for said materials but greater than approximately ninety percent of said critical angle;
and means for producing a varying electric field within said electro-optical material.

2. An optical wave modulator comprising:
a disk of electro-optical material having a pair of planar, parallel surfaces bounded at said surfaces by a second, transparent material of greater optical density;
said surfaces spaced apart a distance equal to an integral multiple of half a guided wavelength for said optical wave;
said disk having a diameter $Y$ given by $$Y = \frac{m \lambda n_1^2}{8} \frac{\sin \varphi \cos \varphi}{[n_2^2 - n_1^2 \sin^2 \varphi]^{3/2}}$$

where
$n_1$ is the index of refraction of said second material,
$n_2$ is the index of refraction of said disk,
$\varphi$ is the angle of incidence of said wave on one of said surfaces,
$m$ is an integer;
and
and means for impressing a varying electric field between said surfaces.

3. An optical wave modulator comprising:
an inner layer of electro-optical material having an index of refraction $n_2$;
said layer having a pair of planar, parallel surfaces spaced apart a distance $d$;
a pair of outer layers of transparent material having a higher index of refraction $n_1$ in contact with said surfaces;
means for directing a wave of coherent light upon one of said surfaces at an angle of incidence $\varphi$ that is less than the critical angle for said materials but greater than approximately ninety percent of the critical angle;
and means for producing a component of varying electric field within said inner layer material perpendicular to said surfaces.

4. The combination according to claim 3 wherein;
said inner layer is potassium dihydrogen phosphate ($KH_2PO_4$) and said outer layers are aluminum oxide ($Al_2O_3$).

5. The combination according to claim 3 wherein;
said distance $d$ between surfaces is equal to an integral number of half a guided wavelength, where a guided wavelength $\lambda_g$ is defined as $$\lambda_g = \lambda \sec \varphi_r$$

where
$\lambda$ is the wavelength of said wave in the inner layer of material,
$\varphi_r$ is the angle of refraction of said wave in said inner layer.

6. The combination according to claim 3 where the minimum transverse dimension $Y$ of said inner layer is given by $$Y = \frac{m \lambda n_1^2}{8} \left[ \frac{\sin \varphi \cos \varphi}{(n_2^2 - n_1^2 \sin \varphi)^{3/2}} \right]$$

where
$m$ is an integer,
and
$\lambda$ is the wavelength of said wave in said electro-optical material.

7. The combination according to claim 3 wherein;
said means for impressing an electric field between said surfaces comprises a fine wire mesh embedded within said modulator at said surfaces.

8. The combination according to claim 3 wherein;
said modulating electric field is supported within a waveguide;
and wherein said modulator is located within a region of said waveguide with its surfaces oriented in a direction perpendicular to the direction of said electric field.

9. An optical wave modulator comprising:
a source of modulating wave energy;
a waveguide cavity tuned to said modulating wave;
means for coupling said source to said cavity;
an element of electro-optical material having a pair of planar, parallel surfaces spaced apart a distance equal to an integral multiple of half a guided wavelength for said optical wave located within said cavity in a region of substantial electric field intensity;

means for supporting said element within said cavity comprising second and third elements of transparent material of greater optical density disposed adjacent to said surfaces;

and means for directing an optical wave upon one of said surfaces at an angle of incidence less than the critical angle for said materials but greater than approximately ninety percent of said critical angle.

References Cited by the Examiner

UNITED STATES PATENTS

| | | |
|---|---|---|
| 2,565,514 | 8/1951 | Pajes. |
| 2,692,952 | 10/1954 | Briggs. |
| 3,102,201 | 8/1963 | Braunstein et al. _____ 250—199 |
| 3,153,691 | 10/1964 | Kibler _____ 250—199 X |
| 3,164,665 | 1/1965 | Stello. |
| 3,183,359 | 5/1965 | White _____ 250—199 |

OTHER REFERENCES

Carpenter, J.O.S.A., vol. 40, No. 4, April 1950

Johnson et al., J. Appl. Physics, vol. 33, No. 12, December 1962.

DAVID G. REDINBAUGH, *Primary Examiner.*

JOHN W. CALDWELL, *Examiner.*